United States Patent [19]

Rexius

[11] Patent Number: 5,636,948
[45] Date of Patent: Jun. 10, 1997

[54] DRILL FOR SYNTHETIC FIBER FILLED PLASTIC AND LIKE MATERIALS

[75] Inventor: William G. Rexius, Hemlock, Mich.

[73] Assignee: Fullerton Tool Company, Inc., Saginaw, Mich.

[21] Appl. No.: 434,786

[22] Filed: May 4, 1995

[51] Int. Cl.⁶ .................................................. B23B 51/02
[52] U.S. Cl. .............................. 408/224; 407/54; 407/59; 408/230; 408/1 R
[58] Field of Search ..................... 408/223, 224, 408/230, 715, 1 R; 407/53, 54, 59

[56] References Cited

U.S. PATENT DOCUMENTS

| | | | |
|---|---|---|---|
| 3,147,646 | 9/1964 | Rawcliffe, Jr. | 408/230 |
| 3,244,034 | 4/1966 | Severdia | 408/72 B |
| 3,443,459 | 5/1969 | Mackey et al. | 408/230 |
| 3,667,857 | 6/1972 | Shaner et al. | 408/230 |
| 4,957,397 | 9/1990 | Huff | 408/230 |

FOREIGN PATENT DOCUMENTS 405057517  3/1993  Japan ................................ 408/230

OTHER PUBLICATIONS

Fluting Specifications, p. 1, Warehouse to the Nation. (Date of publication unknown — but prior art).

Fullerton Tool Catalog 93. (Date of publication unknown — but prior art).

*Primary Examiner*—Steven C. Bishop
*Attorney, Agent, or Firm*—Learman & McCulloch

[57] ABSTRACT

A drill for fiber-filled synthetic plastics has an axially extending body with helical grooves spiraling from a drill point toward a shank end. The grooves define helical lands between them having helical land machining edges. At the point axially tapering land and groove point surfaces converge and land point surfaces with machining edges are radiused to merge gradually with the land surfaces rearward of them. The land machining edges are configured with a negative rake. A plurality of cross notches on the lands extending over an axially extending region of the lands from substantially the axially tapering land point surfaces a predetermined distance toward the shank end are configured to create fiber-snipping crosswise helical cutting edges with a positive rake facing the point.

16 Claims, 2 Drawing Sheets

DRILL FOR SYNTHETIC FIBER FILLED PLASTIC AND LIKE MATERIALS

This invention relates to drills for both thermosetting and thermoplastic plastic compositions which incorporate reinforcing fibers, and are difficult to machine.

BACKGROUND OF THE INVENTION

Presently, a variety of so-called fiber-reinforced engineering polymers are used in a wide range of applications and industries. For example, in the automotive industry they are used as truck lids, van hoods, door panels, bumpers and the like. These plastics can contain as much as 50% by weight of fibers of varying character, including fiberglass, and the fibers can be categorized as short length, long length, and continuous. Many of these fiber reinforced resin composites are of the long fiber variety ranging from 0.2 to 6 mm in length, compared to a range of 0.1 to 0.5 mm in a short fiber composite. Typical synthetic plastics which are utilized are polycarbonates, polyamides, epoxys, and polyurethanes. Such composites, particularly of the long fiber variety, have greatly increased flexural strength and impact strength.

When attempting to drill holes in such materials, which, for example, may have a thickness of ⅛ to ¼ of an inch, with conventional drills, a number of serious problems are encountered. For example, a considerable vibration or chattering occurs which generates a loud noise and further results in holes which are not within size or quality tolerances. Further, the standard tools tend to break out the back side of the plastic, leaving corners which are not sharp and fiber fuzz which extends into the openings drilled, from the marginal walls thereof.

SUMMARY OF THE INVENTION

To overcome the aforementioned problems, the drill of the present invention is provided as an axially extending body having helical grooves or flutes of the same pitch spiraling in one direction from a drill introduction end of the body toward a shank end of the body. These grooves define helical lands of a predesignated width between them, and provide helically extending land machining edges on the leading sides thereof. At the drill introduction end of the axially extending body, axially tapering land and groove surfaces converge to substantially a point. The land and extended axially tapering land portion machining edges are formed with a negative rake to scrape the material away and the axially tapering land surfaces, at their rear ends, are provided with a merging radius which achieves a less aggressive material scraping action and avoids a biting action at the very margins of the holes drilled. A designated number of contiguous, helically pitched cross notches are provided on the lands, in a region extending rearwardly from the radiused surfaces only a predetermined distance toward the shank end, to create crosswise cutting edges on the lands adjacent the drill introduction end of the body. These cross edges have a positive rake angle to cut, rather than scrape, the fibers. Essentially the point of the drill up through the radiused portions is for scraping the hole surfaces to size and the cross cutting edges or teeth on the lands, which typically may have a 55° pitch, are provided to snip off the fibers. The land edges rearward of the point further scrape to finish the hole surfaces and the helical groove portions of the drill rearward of the so called cross edges function to deliver the fine chips or powder back through the non-rotary steady guide which is provided in the form of a non-rotatable bushing. Typically, the tool will be made of a cobalt-tungsten material known as C-2, and coated with a titanium nitride coating. Typical C-2 formulations are 6–10% cobalt and 94–90% tungsten.

One of the prime objects of the present invention is to provide a specially configured drill which very efficiently drills openings having sharp entrance and exit edges, as well as a smoothly machined, interior marginal surface.

A further object of the invention is to provide a drill which is particularly configured to efficiently snip off any fibers which otherwise might protrude from the openings drilled.

Still another object of the invention is to provide a tool which does not force a breakout of the material at the backside of the hole.

Still a further object of the invention is to provide a drill which very accurately drills openings in difficult-to-machine materials of the character mentioned in a rapid and expeditious manner.

Still another object of the invention is to provide a drill which can be economically manufactured, readily re-sharpened when necessary, and which is long lived in operation.

Still another object of the invention is to provide a drill which does not tend to destroy the guide bushing used to steady it, and provides for removal of the fine chips upstream from the bushing via the flutes in the tool.

THE DRAWINGS

The presently preferred embodiment of the invention is disclosed in the following description and in the accompanying drawings, wherein.

DETAILED DESCRIPTION

Figure 1:
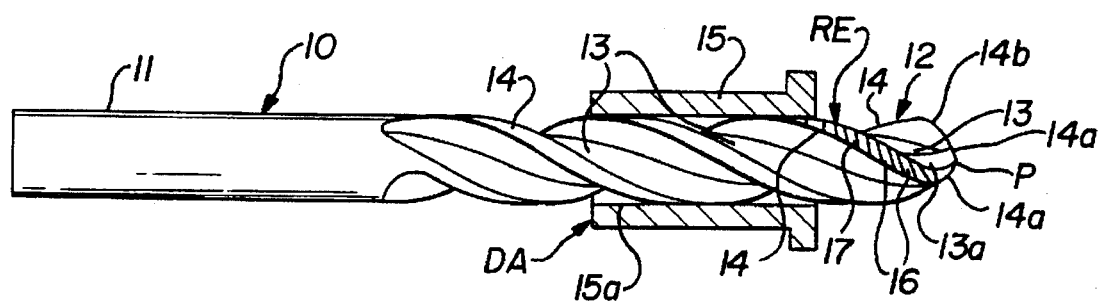
FIG. 1 is a schematic side elevational view showing the drill extending through a typical guide bushing, the drill being shown in fully retracted operating position ready to be moved forwardly relative to the guide bushing to engage a workpiece.

Referring now more particularly to the accompanying drawings, the tool in FIG. 1 is shown as a right hand revolving drill having an axially extending body, generally designated 10, which includes a cylindrical shank end 11 and a drill introduction end, generally designated 12. Extending from the drill introduction end of the body 10, are three equally circumferentially spaced, identically configured, right hand helical grooves or flutes 13 of the same depth which define helical land portions 14 between them.

Figure 2:
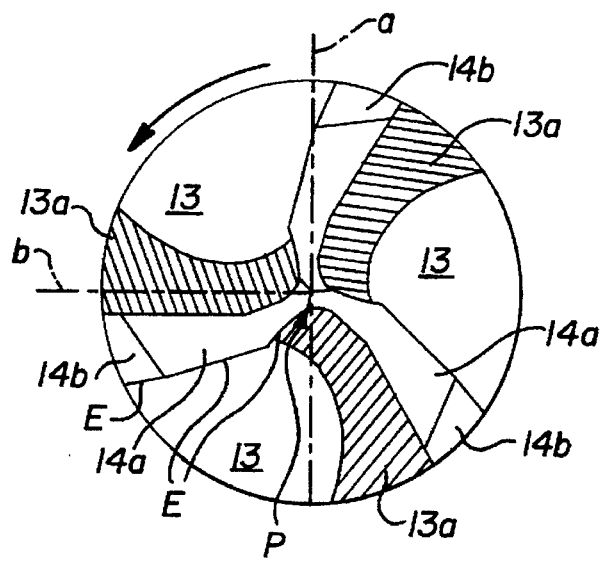
FIG. 2 is an enlarged, schematic end elevational view of the drill introduction end of the tool, with notch or groove point relief surfaces cross hatched to clarify the view.
Figure 3:
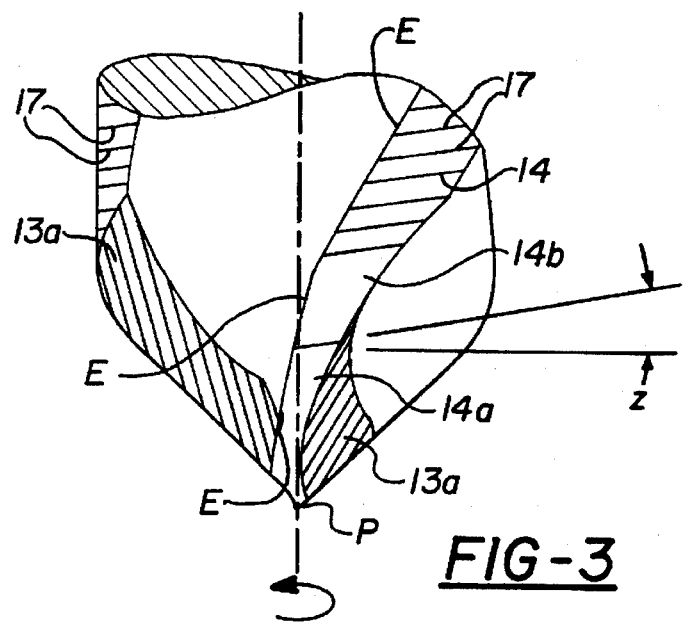
FIG. 3 is a similarly cross hatched, schematic fragmentary, end elevational view of the drill introduction end of the tool only, with the view taken from the direction "a" in FIG. 2.
Figure 4:
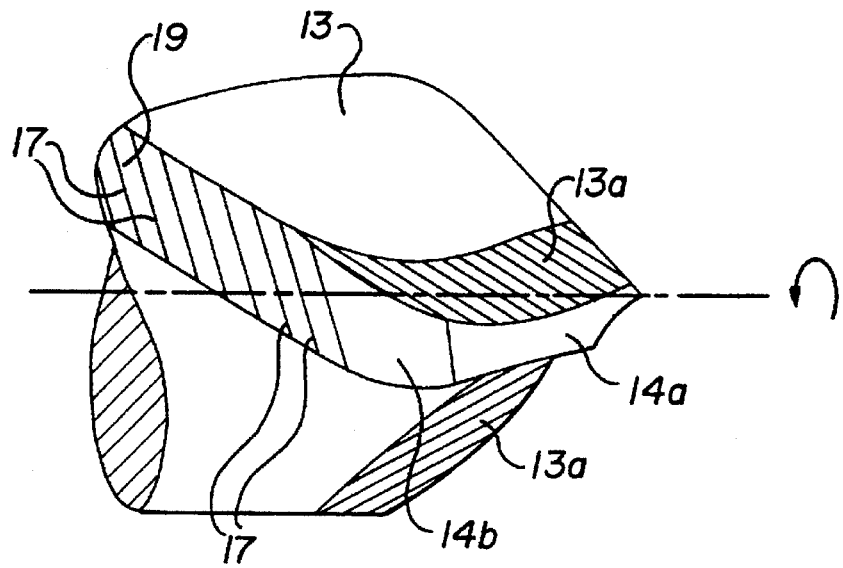
FIG. 4 is a view similar to FIG. 3 with the view taken from the direction "b" in FIG. 2.

The grooves 13 are cut in a cylindrical length of stock having the diameter of the shank part 11, after the point which forms the drill introduction end 12 is roughly cut to a conical shape. The point, shown at 12 in the print and in FIGS. 2–4, is a 90°±5° included angle point which will later be more specifically described. The drill 10, along with a non-rotary steady guide bushing 15, which is fixed against rotation by the drill machine tool, forms part of a drilling assembly generally designated DA. Typically, about 0.001 of an inch in clearance is circumferentially provided between the land portions 14 and the interior wall 15a of the bushing 15.

At their front ends, land portions 14 merge with point land surfaces 14a which taper inwardly from the land portions 14 to converge to a point P.

The convergent portions 14a are very gradually radiused as at 14b to merge with the land surfaces 14. A very gradual radius of 0.08±0.010 of an inch taken from the axis of the drill provides the large radius required for the less aggressive scraping which is desired to machine the margins of the holes drilled. The radiused portion 14b is axially relieved about seven to ten degrees as illustrated at z to facilitate the scraping action of the radiused portion 14b. It is to be understood that the leading edges E (in the direction of rotation) of land portions 14a, 14b, and 14 are formed with a negative rake angle of the character indicated in FIG. 5 and primarily scrape the material to form the opening, rather than biting into it positively in a more aggressive manner.

Figure 5:
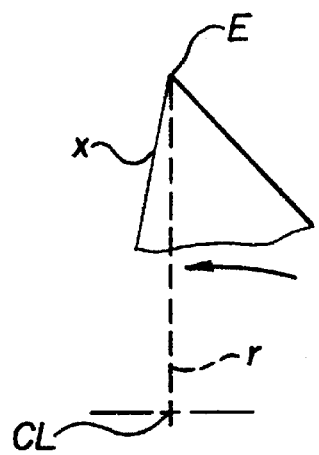
FIG. 5 is an enlarged fragmentary schematic view illustrating the shape of the negatively raked machining edges provided on the leading land edges.

As FIG. 5 indicates, negatively raked teeth are defined as those wherein the edge part "x" to first contact the work leads a true radius "r" from the tip or edge E of the tooth to the center or axis CL of the drill. This produces a material scraping action as the edge surface falls laterally away from the contact.

Figure 6:
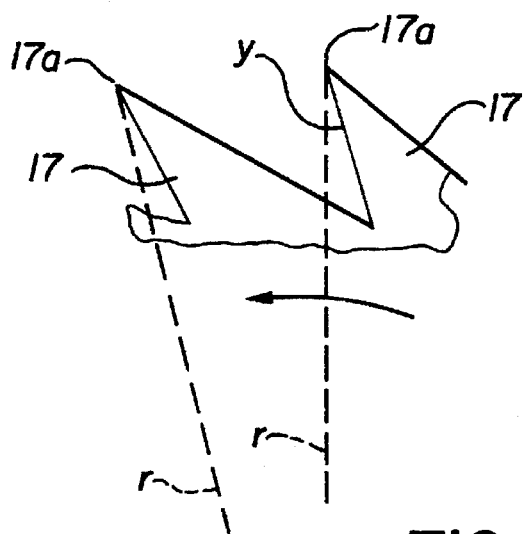
FIG. 6 is an enlarged fragmentary schematic sectional elevational view illustrating the positively cut cross teeth edges provided on a portion of the land peripheral surfaces.

It will be observed that the groove surfaces 13 are also ground or cut down as at 13a to converge to the point P. Each of these surfaces 13a may be termed a notch provided between the land surfaces 14a which are termed primary relief surfaces. In a region RE of land portions 14 just rearwardly of the radiused edges 14b are cross notches, generally designated 16, which define cutting edges 17a on teeth 17. The helical cross notches 16 are cut into the land surfaces 14 in the same direction as flutes 13 but with a considerably higher degree of axial pitch than the flutes 13 and with a positive rake. With positively raked teeth (see FIG. 6), the cutting edge "v" trails the true radial line "r" whereas with true radial cut teeth the cutting edge lies on the radius. With positively raked edges the tooth bites into the fibers in an aggressive manner.

While the spiral of the helically pitched flutes 13 is 30°, for example, the spiral of the cross notches 16 and edges 17a is 55°±5° As indicated, each of the cross notches 16 is of V configuration, such as to define a cutting edge 17a at each of its extremities. The notches 16 are accordingly termed contiguous in the sense that they meet or converge to a common tooth edge 17a. It will be observed that the region RE of notches 16 and edges 17a extends for a relatively short distance on the land portions 14, compared to the length of the land portions 14. The cross notches 16 and teeth 17 terminate short of the bushing 15, so that they do not score the interior of the bushing 15, and, as shown, are less than 1/6th the distance of the extent of land portions 14. Flutes 13, however, extend all the way through the bushing 15 to deliver the drilling chips through the bushing 15 to the rear thereof. The chips, using this drill in the material which is being drilled, exit in the form of a fine powder which, if not delivered rearwardly, would tend to clog both the workpiece and the clearance between the bushing 15 and the drill.

Typically, with a drill of ⅜" diameter the teeth 17 will be cut so that there are 19–21 teeth in an axial length equal to the diameter of the drill. In a ⅞" diameter drill, the ratio used would be that of 30–32 teeth in an axial length equal to the diameter of the drill. The teeth 17 disclosed are not those which could be used in drilling metal, for example, since they would readily break down and would not cut a sharp exit corner as the drill left the hole drilled. The teeth 17 disclosed, cut at the pitch indicated, are particularly suited to cutting the fibers. With the cutting edges 17a spaced in the manner indicated, protruding fibers have not been left by one of the cutting edges 17a before they are engaged by the next successive cutting edge 17a. This is necessary to give the edges 17a time to progressively cut the fibers. The tendency is for fibers connected to the marginal walls of the hole being drilled to be pushed axially out of the hole at the back end of the drilling operation, and it is necessary for one tooth 17 to pull them back to be cut by successive teeth 17.

The three spiral flute drill provides a 90° point, rather than a chisel-edge at the drill introduction end of the drill which would tend to wander and provide an oversize hole, and which would be provided if, for example, only two flutes were formed in the drill. Moreover, the wider lands in a two flute drill would tend to create undue heat in the bushing 15. Theoretically, the drill could be formed with more than three flutes, so long as the cutting edges 17a were so situated that a successive one was presented to the fiber being cut before the cut was finished by the tooth in cutting engagement with it. In a 1½" diameter drill, for example, it might be that six flutes would be used.

In constructing the drill, it is normal to first grind the length of the drilling stock to be used to the desired diameter and then to cut the drill introduction end or point to provide a conical point. Then the three flutes would be cut with the negative rake indicated, after which the land point surfaces 14a and groove point surfaces or notches 13a are finish cut and the land point surfaces 14a then radiused as at 14b. After that, the positively raked cross teeth 17 and cross cutting edges 17a would be cut on the land portions 14 in the manner indicated, and sharpened. The radiused surfaces 14b formed are in the range of 12.5–37.5% of the diameter of the drill, preferably 25% of the diameter. The radiused surfaces 14b, while obviously rotating at the same speed of revolution, do not move axially with as much advancing pressure as the machining edges provided on land surfaces 14, and tend to prevent the drill from breaking out the back side of the plastic.

THE OPERATION

Drilling proceeds typically at 4,000–5,000 revolutions per minute (rpm) within a range of 2,000–7,000 rpm and at a feed rate between 0.003 of an inch per rpm to 0.009 of an inch per rpm, preferably 0.006 of an inch per rpm. The depth of the grooves 13 is uniform throughout the length of the drill to avoid a dynamic out-of-balance condition. As the drill moves through the material, the material is scraped off to open up the hole and, finally, the radiused portions 14b achieve a milder or more gradual scraping action to reach the full diameter of the hole. Protruding fibers are cleanly cut by the tooth edges 17a.

The disclosed embodiment is representative of a presently preferred form of the invention, but is intended to be illustrative rather than definitive thereof. The invention is defined in the claims.

I claim:

1. A drill for fiber-filled synthetic plastics and like material comprising an axially extending body having helical grooves of like pitch spiraling in one direction of orientation relative to the axis of said body from a shank end of said body to a reduced drill introduction tip end of said body, said grooves defining helical lands of predetermined width between them having helically extending land machining edges on one lateral side thereof which spirally lead in said direction of orientation, said drill introduction end of said body comprising axially tapering land and groove tip surfaces of the same said orientation converging substantially from said lands and grooves; said axially tapering land tip surfaces at said drill introduction end being radiused to merge gradually with said lands and having machining edges which spirally lead in said direction of orientation and have a negative rake relative to said axis to scrape an opening into the material being drilled, and a plurality of cross notches on said lands extending helically in the same direction of orientation with a substantially higher direction of pitch than said machining edges over an axially extending region of said lands from substantially said axially tapering land tip surfaces a predetermined distance toward said shank end, said notches being configured to create crosswise cutting edges with a fiber-snipping positive rake relative to said axis facing said drill introduction end of said body.

2. The drill of claim 1 wherein said direction of orientation is right hand.

3. The drill of claim 1 wherein there are three grooves of the same depth producing three lands of a width such that one crosswise cutting edge is not finished with its cut before the next adjacent crosswise cutting edge begins its cut.

4. The drill of claim 1 wherein said region of cross cutting notches extends axially only a certain distance on said lands which is less than a majority of the axial length thereof.

5. The drill of claim 4 wherein said region is about one sixth the axial length of said lands.

6. The drill of claim 1 wherein there are three lands separated by three grooves and said drill introduction end surface is substantially a point.

7. The drill of claim 6 wherein said grooves and lands are helically pitched at an angle in the range of 15–45 degrees.

8. The drill of claim 7 in which said angle is 30°±.

9. The drill of claim 1 wherein said cross notches are V-shaped in cross section and are contiguous to merge into cutting edges.

10. The drill of claim 1 wherein said radiused portion has a radius in the range of 12½% to 37½% of the drill diameter.

11. The drill of claim 10 wherein said radiused portion is radiused about a radius of 0.080±0.010 inches.

12. The drill of claim 6 wherein said cross notches are helically pitched at an angle in the range of 45° to 65°.

13. The drill of claim 13 wherein said cross notches are pitched at an angle of 55°±5°.

14. The drill of claim 4 wherein a non-rotary drill guide bushing is provided in which the land portions upstream from said region of notches revolve.

15. A method of constructing a drill having a rear shank end and a front tip end for drilling holes in fiber-filled synthetic plastic and like material, comprising the steps of:
 a) helically fluting a cylindrical body in a direction of orientation relative to its axis between said rear shank end and a front reduced drill introduction tip end to provide helical lands thereon extending in an axial direction, and providing converging tip land surfaces, having machining edges with a negative rake relative to said axis, and flute relief surfaces, on said drill introduction end;
 b) crosswisely helically grooving said lands rearwardly of said converging tip land surfaces to form crosswise grooves defining cutting edges extending helically in the same direction of orientation with a fiber-snipping rake facing said drill introduction end;
 c) shallowly radiusing said land tip surfaces to merge them into said lands.

16. A method of drilling fiber-filled synthetic plastic material with a drill comprising an axially extending body having helical grooves of the same pitch spiraling in one direction of orientation relative to its axis from a shank end of said body toward a drill introduction end of said body, said grooves defining helical lands between them having helically extending land machining edges on one side thereof which spirally lead in said direction of orientation, said drill introduction end of said body comprising axially tapering land and groove tip surfaces leading in the said direction of orientation converging substantially from said lands and grooves to a reduced drill introduction end tip, said tip land surfaces having leading edges formed with a negative rake relative to said axis to provide a scraping action, said lands having a plurality of cross notches on a land region extending axially from said axially tapering tip land surfaces a predetermined distance toward said shank end configured to create crosswise helical cutting edges with a fiber-snipping positive rake relative to said axis on said lands adjacent the drill introduction end of said body, the steps of:
 a) revolving said drill and its tip land scraping surfaces in said direction of orientation to present leading machining edges with a negative rake relative to said axis to said material to form a hole in said material while said drill is fed at a predetermined feed rate into said material;
 b) while performing step a, scraping said hole to the designated diameter; and
 c) while steps a & b are being performed, pulling still attached fibers, which have been moved axially forwardly out of said hole by said drill without being cut, rearwardly with one crosswise cutting edge and maintaining engagement with one edge until the next successive contiguous crosswise cutting edge engages and snips them fully.

* * * * *